United States Patent [19]

James, Sr. et al.

[11] Patent Number: 4,989,472

[45] Date of Patent: Feb. 5, 1991

[54] REVERSIBLE ANTI-BACKLASH POWER TRANSMISSION

[75] Inventors: James R. James, Sr., Clarksville; John K. Schleicher, Bordon, both of Ind.

[73] Assignee: Accuratio Systems, Inc., Jeffersonville, Ind.

[21] Appl. No.: 296,196

[22] Filed: Jan. 12, 1989

[51] Int. Cl.$^5$ ............................................. F16H 55/18
[52] U.S. Cl. ....................................... 74/409; 74/810.1
[58] Field of Search ................. 74/409, 440, 810, 812; 409/146

[56] References Cited

U.S. PATENT DOCUMENTS

| | | | |
|---|---|---|---|
| 330,391 | 11/1885 | Gifford | 74/409 |
| 2,070,807 | 2/1937 | Roehm et al. | 74/440 |
| 2,224,257 | 12/1940 | Eisele | 409/146 |
| 4,143,888 | 12/1987 | Siler | 74/409 |
| 4,305,307 | 12/1981 | Kiunke | 74/440 X |
| 4,747,321 | 5/1988 | Hanne | 74/409 X |

OTHER PUBLICATIONS

"18 Ways to Control Backlash in Gearing", Product Engineering, Oct. 26, 1959.

Primary Examiner—Kenneth J. Dorner
Assistant Examiner—Gerald A. Anderson
Attorney, Agent, or Firm—Jon C. Winger

[57] ABSTRACT

A reversible anti-backlash power transmission for selectively transmitting power in opposite directions without backlash in the gear train. The transmission includes interconnected first and second gear boxes. Each gear box includes a drive shaft having a worm associated with the drive shaft for rotation therewith, a worm gear in meshing engagement with the worm, a driven shaft associated with the worm gear for rotation therewith, and a pinion gear structurally associated with the drive shaft for rotation therewith. A rack gear is in meshing engagement with the pinion gear of each of the first and second gear boxes. An electro-magnetic coupler interconnects the drive shafts of the gear boxes. The coupler allows the automatic angular displacement of the drive shafts of the two gear boxes relative to each other to eliminate gear backlash in any of the mating gears.

13 Claims, 4 Drawing Sheets

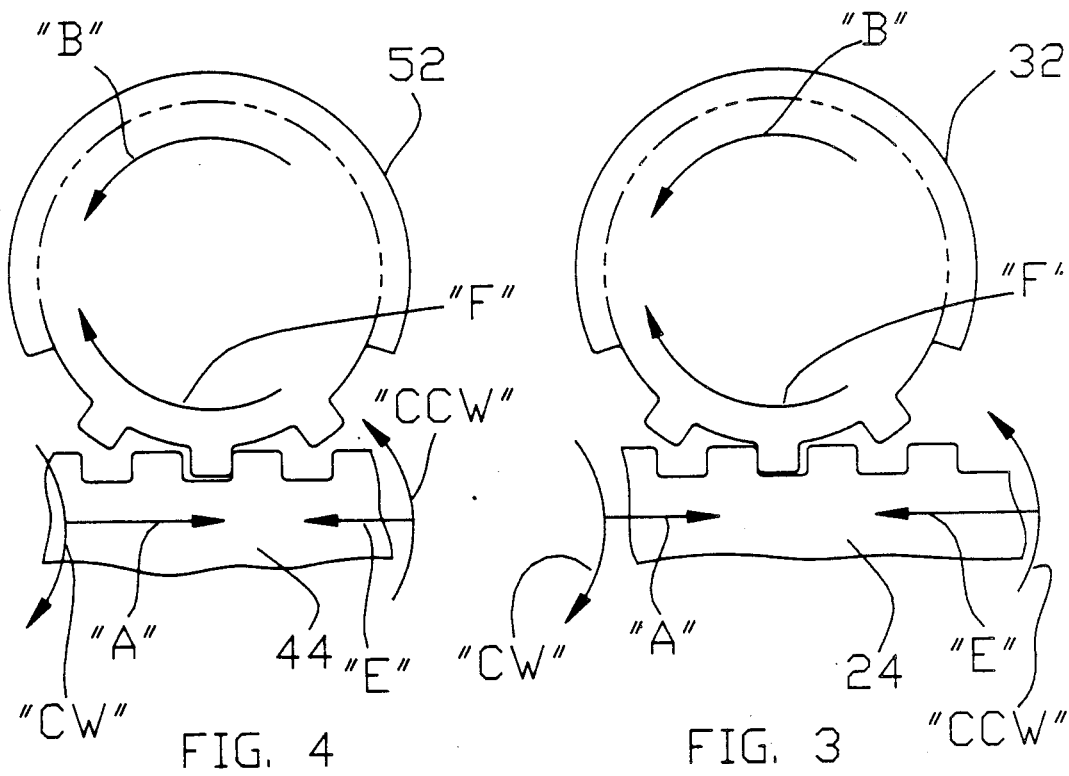

4,989,472

REVERSIBLE ANTI-BACKLASH POWER TRANSMISSION

BACKGROUND OF THE INVENTION

The present invention relates to a reversible transmission for selectively transmitting power in opposite directions, and more particularly, to such a transmission in which backlash in the gear train is eliminated as the gears wear.

Reversible transmissions for selectively transmitting power in opposite directions are, per se, known. However, a problem which exists in such transmissions known to me is backlash in the transmission gear train. The backlash is not only noisy, but also causes the gears to wear excessively as well as subjecting the gear teeth to shock loads. The backlash further results in a lag time in the transmission of power particularly when the direction of power transmission is changed.

SUMMARY OF THE INVENTION

The present invention recognizes these drawbacks and provides an anti-backlash, selectively reversible power transmission which provides a straightforward solution to these drawbacks.

The present invention also provides an anti-backlash, selectively reversible transmission which allows the automatic adjustment of the meshing relationship of the various gears of the transmission to compensate for gear wear.

More particularly, the present invention provides an anti-backlash, selectively reversible power transmission comprising: (a) a first gear box comprising a drive shaft, a drive worm structurally associated with the drive shaft for rotation therewith about the axis of rotation of the drive shaft, a driven shaft having an axis of rotation perpendicular to the axis of rotation of the drive shaft, a worm gear structurally associated with the driven shaft for rotation therewith, the worm gear being in meshing engagement with the drive worm, and a pinion gear structurally associated with the driven shaft for rotation therewith; (b) a second gear box comprising a drive shaft, a drive worm structurally associated with the drive shaft for rotation therewith about the axis of rotation of the drive shaft, a driven shaft having an axis of rotation perpendicular to the axis of rotation of the drive shaft, a worm gear structurally associated with the drive shaft for rotation therewith, the worm gear being meshing engagement with the drive worm, and a pinion gear structurally associated with the driven shaft for rotation therewith; (c) an electrically-actuated clutch coupler located between the first gear box and the second gear box interconnecting the drive shaft of the first gear box and the drive shaft of the second gear box, the electrically-actuated clutch coupler comprising a first clutch element mounted to the drive shaft of the first gear box for rotation therewith and a second clutch element mounted to the drive shaft of the second gear box for rotation therewith, and electro-magnetic means associated with the first and second clutch elements for selectively drivingly attaching the first and second clutch elements together upon electrical energization thereof.

BRIEF DESCRIPTION OF THE DRAWINGS

A better understanding of the invention will be had upon reference to the following description in conjunction with the accompanying drawings in which like numerals refer to like parts and wherein:

FIG. 3 is an enlarged schematic representation of the meshing relationship between gears of the first gear box of the transmission of FIG. 1;

FIG. 4 is an enlarged schematic representation showing the meshing relationship between gears of the second gear box of the transmission of FIG. 1; and, FIG. 5 is an enlarged schematic representation showing the meshing relationship between the pinion gears of the gear boxes and interconnecting gear rack of the transmission of FIG. 1.

DETAILED DESCRIPTION OF THE PREFERRED EMBODIMENT

Figure 1:
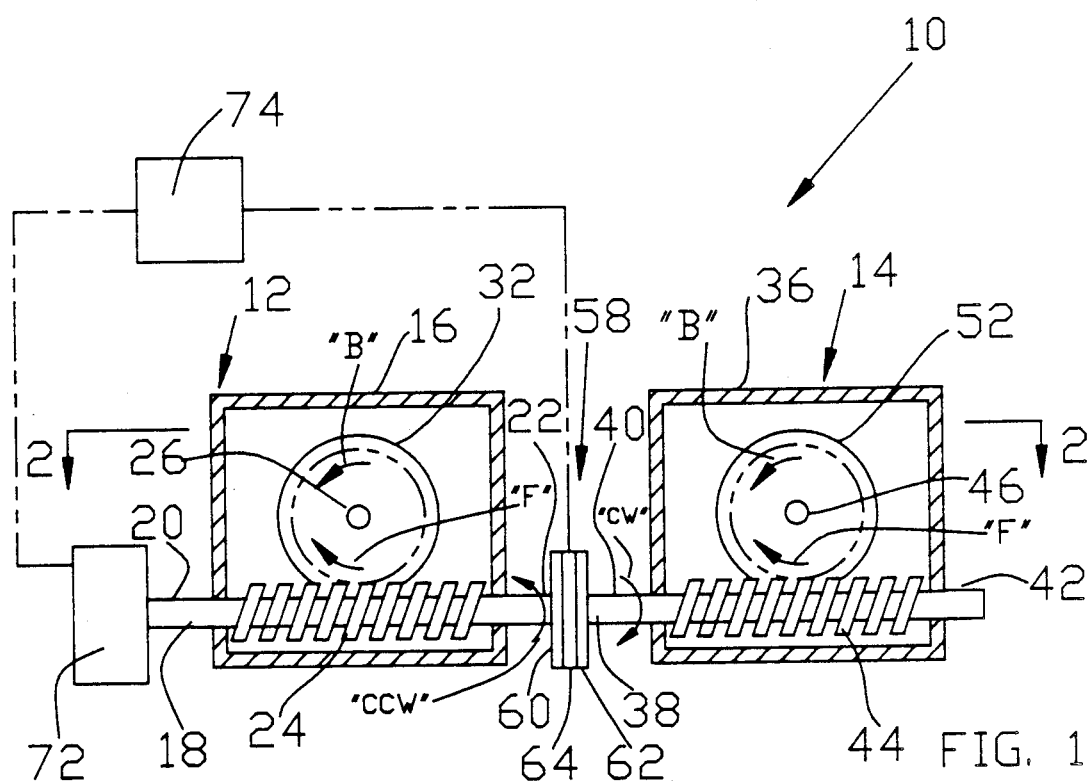
FIG. 1 is a schematic cross-sectional side view of the reversible, anti-backlash transmission of the present invention.
Figure 2:
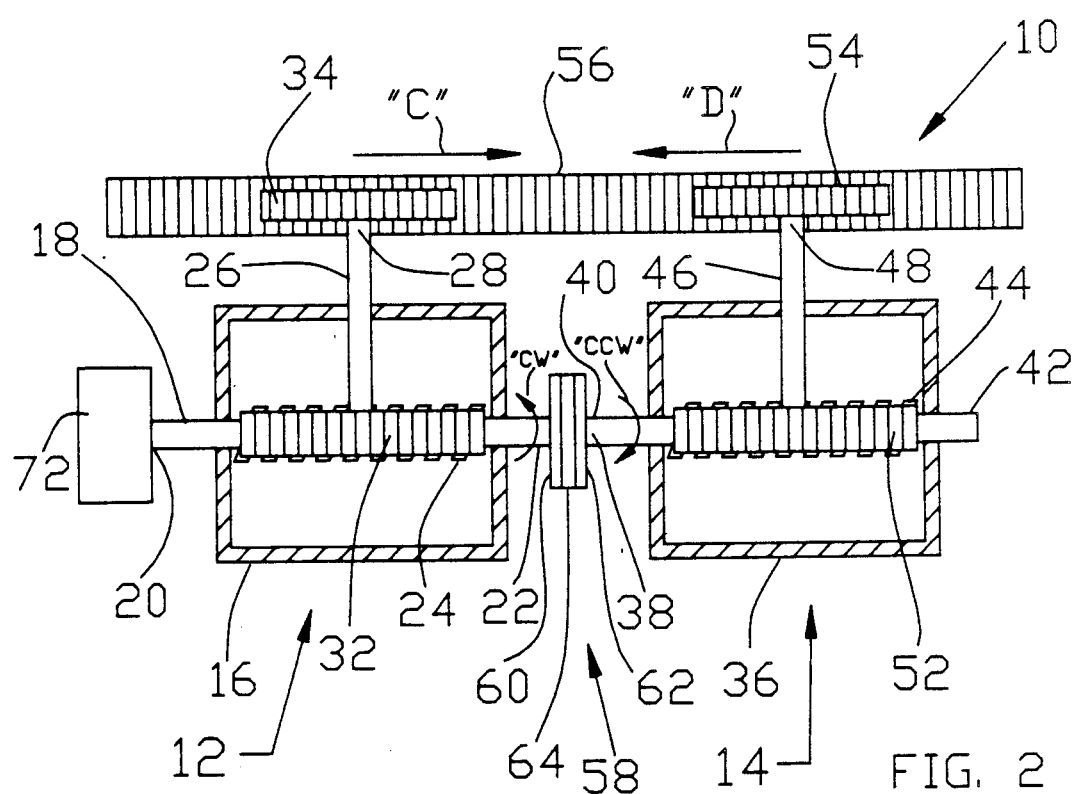
FIG. 2 is a schematic cross-sectional top view of the reversible, anti-backlash transmission of the present invention as seen in the direction of arrows 2—2 in FIG. 1.

With reference to FIGS. 1 and 2, there is shown a selectively reversible, anti-backlash power transmission, generally denoted as the numeral 10, of the present invention for driving a mechanism (not shown) selectively in one of two directions, for example a forward and a reverse direction. The transmission 10 comprises a first gear box 12 and a second gear box 14 which define a gear train of the transmission 10 as will hereinafter be described in detail.

The first gear box 12 comprises a gear casing 16 (illustrated in cross-section in FIGS. 1 and 2), and a first drive shaft 18 extending through the casing 16 and having its opposite ends 20 and 22 extending outwardly therefrom. First gear means such as a first drive worm 24 located within the casing 16 is structurally associated with the first drive shaft 18 for rotation with the first drive shaft 18 about the axis of rotation of the first drive shaft 18. Toward this objective, the first drive worm 24 and first drive shaft 18 can be integrally formed, or can be individual components keyed together. First driven shaft 26 extends into the casing 16 with its axis of rotation perpendicular to the axis of rotation of the first driven shaft 18 and spaced from the first drive shaft 18. One end 28 of the first driven shaft 26 extends outwardly of the casing 16 and the first driven shaft 26 is appropriately journalled to a wall of the casing 16. Second gear means such as a first worm gear 32 located within the casing 16 is structurally associated with the first driven shaft 26 for rotation with the first driven shaft 26. The first worm gear 32 is in meshing engagement with the first drive worm 24. The first worm gear 32 and first driven shaft 26 can be integrally formed, or can be individual components keyed together. A first pinion gear 34 is structurally associated with the first driven shaft 26 outside of the casing 16 for rotation with the first driven shaft 26. As shown, the first pinion gear 34 is attached to the first driven shaft 26 proximate the extending end 28 of the first driven shaft 26.

With continued reference to FIGS. 1 and 2, the second gear box 14 comprises a gear casing 36 (illustrated in cross-section in FIGS. 1 and 2), and a second drive shaft 38 having its opposite ends 40 and 42 extending outwardly therefrom. Third gear means such as a second drive worm 44 located within the casing 36 is structurally associated with the second drive shaft 38 for rotation with the second drive shaft 38 about the axis of rotation of the second drive shaft 38. Toward this objective, the second drive worm 44 and the second drive shaft 37 can be integrally formed, or can be individual components keyed together. A second driver shaft 46 extends into the casing 36 with its axis of rotation perpendicular to the axis of rotation of the second drive shaft 38 and spaced from the second drive shaft 38. On end 48 of the second driven shaft 46 extends outwardly of the casing 36 and the second driven shaft 46 is appropriately journalled to a wall of the casing 36. Fourth gear means such as a second worm gear 52 located within the casing 36 is structurally associated with the second driven shaft 46 for rotation with the second driven shaft 46. The second worm gear 52 is in meshing engagement with the second drive worm 44. The second worm gear 52 and second driven shaft 46 can be integrally formed, or can be individual components keyed together. A second pinion gear 54 is structurally associated with the second driven shaft 46 outside of the casing 36 for rotation with the second driven shaft 46. As shown, the second pinion gear 54 is attached to the second driven shaft 46 proximate the extending end 48 of the second driven shaft 46.

Still referring to FIG. 2, the transmission 10 further includes a final drive gear means such as gear rack 56. The gear rack 56 extends between the second pinion gear 34 of the first gear box 12 and the second pinion gear 54 of the second gear box 14 perpendicular to the second driven shaft 26 of the first gear box 12 and the second driven shaft 46 of the second gear box 14. The gear rack 56 is in meshing engagement with both the second pinion gear 34 of the first gear box 12 and the second pinion gear 54 of the second gear box 14.

The drive train of the transmission 10 consists of the drive worm 24, worm gear 32, pinion gear 34, rack gear 56, pinion gear 54, worm gear 52, and drive worm 44.

With reference to FIGS. 1, 2, the transmission 10 also includes an electro-magnetic coupler 58 located between the first gear box 12 and second gear box 14 interconnecting the first drive shaft 18 of the first gear box 12 and the second drive shaft 38 of the second gear box 14. The electro-magnetic coupler 58 comprises a first friction clutch element 60 mounted to the first drive shaft 18 of the first gear box 12 for rotation with the first drive shaft 18 and a second friction clutch element 62 mounted to the second drive shaft 38 of the second gear box 14 for rotation with the first second drive shaft 38. For example, the first friction clutch element 60 is affixed to the extending end 22 of the first of the drive shaft 18 and the second friction clutch element 62 is affixed to the extending end 40 of the second drive shaft 38. As shown, the first and second clutch elements 60 and 62 are disposed in facing relationship to each other. The electro-magnetic coupler 58 further includes an armature 64 which when electrically energized creates a magnetic field which moves one of the friction clutch elements towards the other friction clutch element until the first and second clutch elements 60 and 62 are in mutual frictional contact to transmit a rotational motion of one drive shaft 18 to the other drive shaft 38 without shippage.

The extending end 20 of, for example, the first drive shaft 18 of the first gear box 12 is attached to a reversible prime mover 72 such as, for example, an electric motor, and the gear rack 56 is attached to the mechanism (not shown) to be driven or moved by the prime mover 72.

With reference to FIGS. 1, 2, 3, 4 and 5 backlash in all of the mating gears of the reversible transmission 10 is eliminated by the electro-magnetic coupler 58. Specifically, any backlash between the meshing first drive worm gear 24 and first worm gear 32 of the first gear box 12 (see FIG. 3), the meshing first pinion gear 34 of the first gear box 12 and rack gear 56 (see FIG. 5), the meshing second drive worm gear 44 and second worm gear 52 of the second gear box 12 (see FIG. 4), and the meshing pinion gear 54 of the second gear box 14 and rack gear 56 (see FIG. 5) is eliminated by the operation of the electro-magnetic coupler 58. This is accomplished by maintaining a rotational displacement between the drive shaft 18 of the first gear box 12 and the first drive shaft 38 of the second gear box 14 as will hereinafter be described.

By maintaining a rotational displacement between the second drive shaft 18 of the first gear box 12 and second drive shaft 38 of the second gear box 14, the backlash between the first worm gear 32 and the second drive worm 24 of the first gear box 12, the backlash between the second worm gear 52 and the second drive worm gear 44 of the second gear box 14, the backlash between the first pinion gear 34 of the first gear box 12 and the gear rack 56, and the backlash between the second pinion gear 54 of the second gear box 14 and gear rack 56 are all taken-up or eliminated.

As the various gears of the transmission 10 may wear, the free play between meshing gears produced and resulting backlash can be eliminated by adjusting the rotational displacement between the first drive shaft 18 of the second first gear box 12 and drive shaft 38 of the second gear box 14 as will hereinafter be described.

Figure 5:
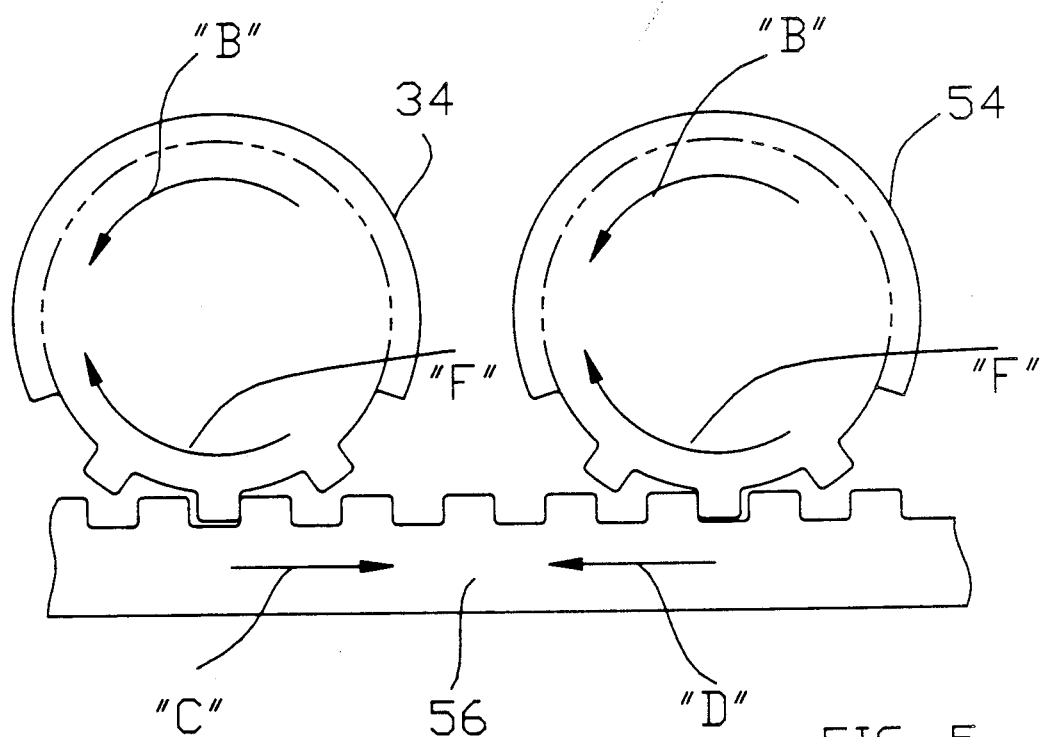

In operation of the transmission 10 to eliminate free play and backlash in the gear train before the transmission 10 is placed in operation driving a mechanism, the electro-magnetic coupler 58 is de-energized so that it does not couple the first drive shaft 18 of the first gear box 12 to the second drive shaft 38 of the second gear box 14, and the prime mover 72 is actuated. The prime mover 72 rotates the drive shaft 18 of the first gear box 12 in a first rotational direction, for example clockwise as indicated by the arrow "CW" in FIGS. 1 and 2, while the drive shaft 38 of the second gear box 14 remains stationary thus creating a rotational displacement between the drive shaft 18 of the first gear box 12 and the drive shaft 38 of the second gear box 14. With reference to FIG. 3, with the reversible prime mover 72 operated driving the first drive shaft 18 clockwise, the first drive worm 24 is driven so that its spiral gear teeth advance in the direction indicated by the arrow "A" bringing the meshing gear teeth of the first driven worm 24 into positive contact with the gear teeth of the first worm gear 32 on the pressure line of these two gears 24 and 32. With reference to FIGS. 3 and 5, the first drive worm 24 causes the first worm gear 32 to rotate in the direction indicated by the arrow "B" (see FIG. 3) which causes the first pinion gear 34 to also rotate in the same direction indicated by the arrow "B" (see FIG. 5) bringing the meshing gear teeth of the first pinion gear 34 into positive contact with the gear teeth of the rack gear 56 on the pressure line of these two gears 34 and 56. With reference to FIG. 5, the rotation first pinion gear 34 in the direction of arrow "B" causes the rack gear 56 to move in one direction indicated by the arrow "C" bringing the meshing gear teeth of the rack gear 56 in positive contact with the gear teeth of the second pinion gear 54 on the pressure line of these two gears 54 and 56. Note that positive contact of the gear teeth of the first pinion gear 34 with the gear teeth of the rack gear 56 and the positive contact of the gear teeth of the second pinion gear 54 with the gear teeth of the rack gear 56 are to opposite sides of the gear teeth of the rack 56. With reference to FIGS. 4 and 5, the second rotation of the pinion gear 54 in the direction of arrow B (see FIG. 5) causes the second worm gear 52 to also rotate in the same direction indicated by the arrow "B" (see FIG. 4) bringing the meshing gear teeth of the second worm gear 52 into positive contact with the gear teeth of the second drive worm 44 on the pressure line of these two gears 44 and 52. Note that the positive contact of the gear teeth of the first drive first worm 24 and the worm gear 32 of the first gear box 12 and the positive contact of the gear teeth of the second drive worm 44 and second worm gear 52 of the second gear box 14 are to opposite sides of the meshing gears relative to each other. Thus, the meshing gear teeth of all of the various gears of the gear train of the transmission 10 are in positive contact with no free play therebetween, thereby eliminating all backlash in the gear train when the drive shaft 18 of the first gear box 12 is rotated while the drive shaft 38 of the second gear box 14 remains stationary to create a rotational displacement between the drive shaft 18 of the first gear box 12 and the drive shaft 38 of the second gear box 14. The electro-magnetic coupler 58 is energized coupling the first drive shaft 18 of the first bear box 12 and the second drive shaft 38 of the second gear box 14 thereby maintaining the positive contact between the meshing gear teeth of the various gears of the transmission gear train.

In operation of the transmission 10 to transmit power to the final drive gear 56 in one direction, for example a forward direction (indicated by the Arrow "C" in the FIGS. 2 and 5), the electro-magnetic coupler 58 is energized and the prime mover 72 operated to transmit power through the first gear box 12 to the final drive gear 56. The prime mover 72 turns the drive shaft 18 in one direction, for example a clockwise direction indicated by the Arrow "CW" in FIGS. 2, 3, and 4, which causes the drive worm 24 to also rotate clockwise thereby advancing the spiral of the drive worm 24 in the direction indicated by the Arrow "A" in FIG. 3. For the reason that the spiral gear teeth of the drive worm 24 is in positive contact with the gear teeth of the worm gear 32 at one side of the gear teeth of the two gears 24 and 32 as described above, the drive worm 24 drives the worm gear 32 in a counter-clockwise direction as indicated by the Arrow "B" in FIG. 3. The worm gear 32 being attached to the driven shaft 26 causes the pinion gear 34 also attached to the driven shaft 26 to rotate in a counter-clockwise direction as indicated by the Arrow "B" in FIG. 5. For the reason that the gear teeth of the pinion gear 34 is in positive contact with the gear teeth of the final drive gear rack 56 at one side of the gear teeth of the two gears 34 and 56 as described above, the pinion gear 34 drives the final drive gear rack 56 in the forward direction indicated by the Arrow "C" in FIGS. 2 and 5. Further, even though the drive shaft 38 of the second gear box 14 is caused to also turn in the clockwise direction with the drive shaft 18 of the first gear box 12 because the coupler 58 is energized, the second gear box 14 does not function to transmit power to the final drive gear 56 because the gear teeth of the drive worm 44 are not in positive contact with the gear teeth of the worm gear 52 to the appropriate side thereof which would provide for power transmission from the drive worm gear 44 advancing in the direction of Arrow "A" to the worm gear 52 to drive the worm gear 52 in the direction of Arrow "B" (see FIG. 4). Likewise, the gear teeth of the pinion gear 54 are not in positive contact with the gear teeth of the final drive gear rack 56 to the appropriate side thereof which would provide for power transmission from the pinion gear 54 rotating in the direction of Arrow "B" to drive the final drive gear rack 56 in the forward direction indicated by the Arrow "C" (see FIG. 5).

In operation of the transmission 10 to transmit power to the final drive gear 56 in the opposite direction. for example a reverse direction (indicated by the Arrow "D" in FIGS. 2 and 5) the electro-magnetic coupler 58 is energized and the prime mover 72 is operated to transmit power through the second gear box 14 to the final drive gear 56. The prime mover 72 turns the drive shaft 18 of the first gear box 12 and, therefore, the drive shaft 38 of the second gear box 14 in the opposite direction, for example a counter-clockwise direction indicated by the Arrow "CCW" in FIGS. 2, 3, and 4, which causes the drive worm 44 to also rotate counter-clockwise thereby advancing the spiral of the drive worm 44 in the direction indicated by the Arrow "E" in FIG. 4 opposite or reverse to the direction indicated by the Arrow "A". For the reason that the spiral gear teeth of the drive worm 44 is in positive contact with the gear teeth of the worm gear 52 at the other side of the gear teeth of the two gears 44 and 52 as described above, the drive worm 44 drives the worm gear 52 in a clockwise direction as indicated by the Arrow "F" in FIG. 4. The worm gear 52 being attached to the driven shaft 46 causes the pinion gear 54 also attached to the driven shaft 46 to rotate in a clockwise direction as indicated by the Arrow "F" in FIG. 5. For reason that the gear teeth of the pinion gear 54 is in positive contact with the gear teeth of the final drive gear rack 56 at the other side of the gear teeth of the two gears 34 and 56 as described above, the pinion gear 54 drives the final drive gear rack in the reverse direction indicated by the Arrow "D" in FIGS. 2 and 5 opposite to the direction indicated by the Arrow "C". Further, even though the drive shaft 18 of the first gear box 12 is caused to also turn in the counter-clockwise direction with the drive shaft 38 of the second gear box 14 because the coupler 58 is energized, the first gear box 12 does not function to transmit power to the final drive gear 56 because the gear teeth of the worm gear 24 are not in positive contact with the gear teeth of the worm gear 32 to the appropriate side thereof which would provide for power transmission from the drive worm gear 24 advancing in the direction of Arrow "E" to the worm gear 32 to drive the worm gear 32 in the direction of Arrow "F" (see FIG. 3). Likewise, the gear teeth of the pinion gear 34 are not in positive contact with the gear teeth of the final drive gear rack 56 to the appropriate side thereof, which would provide for power transmission from the pinion gear 34 rotating in the direction of Arrow "F" to drive the final drive gear rack in the reverse direction indicated by the Arrow "D" (see FIG. 5).

It is contemplated that the prime mover 72 and electro-magnetic coupler 58 will be operatively connected to controller means such as a micro-processor or computer 74 and that the micro-processor or computer is programmed to periodically de-energize the coupler 58 and activate the prime mover 72 for a predetermined angle of rotation of the first drive shaft 18, and then re-energe the coupler 58 to automatically remove any free play in the gear train which may from time to time occur to periodically remove backlash between the gear teeth of the various meshing gears and thereby remove backlash from the transmission 10 as discussed fully immediately above. The micro-processor 74 can be programmed to automatically remove backlash at any time. Most preferably, this automatic operation would be performed at times not to interfere with the operation of the transmission driving the mechanism. Therefore, the micro-processor 74 can be programmed to perform the function of removing free play from the gears during a normal idle-time of the transmission that is, when the equipment driven by the transmission 10 is not being operated or used.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. An anti-backlash, selectively reversible power transmission comprising:
   (a) a first gear box for transmitting power in one direction, comprising:
   a first drive shaft;
   first gear means associated with the first drive shaft for rotation therewith;
   a first driven shaft;
   second gear means associated with the first driven shaft for rotation therewith in meshing engagement with the first gear means of the first drive shaft; and,
   first driven gear means associated with the first driven shaft for rotation therewith;
   (b) a second gear box for transmitting power in the opposite direction comprising:
   a second drive shaft;
   third gear means associated with the second drive shaft for rotation therewith;
   a second driven shaft;
   fourth gear means associated with the second driven shaft for rotation therewith in meshing engagement with the third gear means of the second driven shaft; and
   second driven gear means associated with the second driven shaft for rotation therewith;
   (c) final drive gear means in meshing engagement with the first driven gear means of the first gear box to the driven thereby in one direction, and in meshing engagement with the second driven gear means of the second gear box to be driven thereby in the opposite direction; and,
   (d) electro-magnetic friction coupler means for selectively coupling and uncoupling the first drive shaft of the first gear box and the second drive shaft of the second gear box.

2. The anti-backlash power transmission to claim 1, wherein:
   the first driven shaft of the first gear box has an axis of rotation perpendicular to the axis of rotation of the first drive shaft of the first gear box; and
   the second driven shaft of the second gear box rotation of the second drive shaft of the second gear box.

3. The anti-backlash power transmission of claim 1, wherein the axis of rotation of the first drive shaft of the first gear box and axis of rotation of the second drive shaft of the second gear box are in alignment.

4. The anti-backlash power transmission of claim 1, wherein:
   the first driven gear means of the first gear box is a first pinion gear attached to the first driven shaft of the first gear box; and,
   the second driven gear means of the second gear box is a second pinion gear attached to the second driven shaft of the second gear box.

5. The anti-backlash power transmission of claim 1, wherein:
   the first gear means associated with the first drive shaft of the first gear box is a first worm having its axis of rotation coaxial with the first drive shaft of the first gear box; and,
   the third gear means associated with the second drive shaft of the second gear box is a second worm having its axis or rotation coaxial with the second drive shaft of the second drive shaft of the second gear box.

6. The anti-backlash power transmission of claim 5, wherein:
   the second gear means associated with the first driven shaft of the first gear box is a first worm gear having its axis of rotation coaxial with the first driven shaft of the first gear box; and,
   the fourth gear means associated with the second driven shaft of the second gear box is a second worm gear having its axis of rotation coaxial with the second driven shaft of the second gear box.

7. The anti-backlash power transmission of claim 1, wherein the first driven shaft of the first gear box is substantially parallel to the second driven shaft of the second gear box.

8. The anti-backlash power transmission of claim 1, wherein the final drive gear is a gear rack.

9. The anti-backlash power transmission of claim 8, wherein:
   the axis of rotation of the first drive shaft of the first gear box and the axis of rotation of the second drive shaft of the second gear box are in alignment; and,
   the gear rack moves back and forth in the direction substantially parallel to the axis of rotation of the first drive shaft of the first gear box and the axis of rotation of the second drive shaft of the second gear box.

10. The anti-backlash power transmission of claim 1, wherein the electro-magnetic friction coupler comprises:
    a first friction clutch element mounted to the first drive shaft of the first gear box for rotation therewith;
    a second friction clutch element mounted to the second drive shaft of the drive shaft of the second gear box for rotation therewith; and,
    armature means operatively associated with the first and second friction clutch elements for causing the first and second friction clutch elements to mutually frictionally engage upon energization of the armature means.

11. The anti-backlash transmission of claim 1, further comprising:
    a prime mover operatively connected to the first drive shaft of the first gear; and, a mechanism to be driven operatively associated with final drive gear means.

12. The anti-backlash transmission of claim 11, further comprising controller means operatively associated with the prime mover and the electro-magnetic friction coupler for periodically de-energizing the electromagnetic coupler thereby uncoupling the first drive shaft of the first gear box and the second drive shaft of the second gear box, and concurrently activating the prime mover, causing the prime mover to transmit power directly to the first gear box in one rotational direction of the first drive shaft of the first gear box and also to the second gear box through the final drive gear means thereby moving all of the gears of the gear train of the transmission to bring the meshing gear teeth of all of the gears thereof into positive contact removing all of the free play between the meshing gear teeth of all of the gears of the gear train of the transmission, after a predetermined angle of rotation of the prime mover re-energizing the electro-magnetic coupler thereby coupling the first drive shaft of the first gear box and the second drive shaft of the second gear box, and then de-activating the prime mover thereby maintaining positive contact between meshing gear teeth of all of the gears of the transmission.

13. A method for removing all the free-play between meshing gear teeth of the gears in a gear train of a selectively reversible power transmission including a first gear box for transmitting power in one direction comprising a first drive shaft, first gear means associated with the first drive shaft for rotation therewith, a first driven shaft, second gear means associated with the first driven shaft for rotation therewith in meshing engagement with the first gear means of the first drive shaft, first driven gear means associated with the first driven shaft for rotation therewith, a second gear box for transmitting power in the opposite direction comprising a second drive shaft, third gear means associated with the second drive shaft for rotation therewith, a second driven shaft, fourth gear means associated with the second driven shaft for rotation therewith in meshing engagement with the third gear means of the second drive shaft, second driven gear means associated with the second driven shaft for rotation therewith, final drive gear means in meshing engagement with the first driven gear means of the first gear box to be moved in a first direction thereby and in meshing engagement with the second driven gear means of the second gear box to be moved in a second direction opposite to the first direction thereby, and electro-magnetic friction coupler means for selectively coupling and uncoupling the first drive shaft of the first gear box and the second drive shaft of the second gear box, the method comprising the steps of:

de-energizing the electro-magnetic coupler thereby uncoupling the first drive shaft of the first gear box from the second drve shaft of the second gear box;

turning the first drive shaft of the first gear box in the rotational direction moving the final drive means in the first direction until the meshing teeth of the first gear means of the first drive shaft of the first gear box and the teeth of the second gear means of the first driven shaft of the first gear box are in positive mutual contact, until the meshing teeth of the first driven gear means of the first drive shaft of the first gear box and the teeth of the final drive gear means are in positive mutual contact, until the meshing teeth of the final drive gear means and the teeth of the foruth driven gear means of the second driven shaft of the second gear box are in positive mutual contact, until the meshing teeth of the fourth gear means of the second driven shaft of the second gear box and the teeth of the third gear means of the second drive shaft of the second gear box are in positive mutual contact;

re-energizing the electro-magnetic coupler thereby coupling the first drive shaft of the first gear box to the second drive shaft of the second gear box while continuing to turn the first drive shaft of the first gear box in the same rotational direction to maintain the meshing teeth of all of the gears of the gear train of the transmission in positive mutual contact; and, ceasing the turning of the first driven shaft of the first gear box.

* * * * *